United States Patent [19]

Schlumberger et al.

[11] 4,412,816

[45] Nov. 1, 1983

[54] SLIDING SHOE FOR A PUSHER FURNACE

[75] Inventors: Jules Schlumberger; Heinrich Aebli, both of Kreuzlingen, Switzerland

[73] Assignee: Gautschi Electro-Fours AG, Tägenwilen, Switzerland

[21] Appl. No.: 324,199

[22] Filed: Nov. 23, 1981

[30] Foreign Application Priority Data

Jan. 16, 1981 [CH] Switzerland .......................... 272/81

[51] Int. Cl.[3] .......................... F27D 3/00; B65G 19/30

[52] U.S. Cl. .................................... 432/239; 198/721; 414/150; 414/157

[58] Field of Search ................ 432/234, 239; 414/150, 414/157; 198/721

[56] References Cited

U.S. PATENT DOCUMENTS 1,851,913 3/1932 Lange ................................. 432/239
2,167,640 8/1939 Cope .................................. 432/239
3,944,057 3/1976 Schuette et al. .................... 198/721

*Primary Examiner*—John J. Camby
*Attorney, Agent, or Firm*—Werner W. Kleeman

[57] ABSTRACT

A sliding shoe or member for a pusher or reheating furnace for the sliding transport of substantially bar-shaped heated objects has an essentially U-shaped profile or sectional shape and is provided with downwardly protruding legs for the laterally guided support of the sliding shoe on a rail. At its inner web side the sliding shoe is provided with sliding elements which consist of a material which has a coefficient of friction sufficient for an essentially wear-free feed or advance of the sliding elements and thus the shoes at the central region of the rail at a furnace temperature of about 600° to 700° C. These measures afford sliding characteristics which make it unnecessary to provide additional lubrication between the sliding shoes and the rail.

7 Claims, 2 Drawing Figures

SLIDING SHOE FOR A PUSHER FURNACE

BACKGROUND OF THE INVENTION

The present invention relates to a new and improved construction of a sliding shoe or member for pusher or continuous heating furnaces, which serves for the sliding transport through the furnace of heated objects which are placed upon the sliding shoe. The sliding shoe has an at least approximately U-shaped profile or cross-sectional shape and is provided with downwardly protruding legs serving for the laterally guided support of the sliding shoe on the rail or rail means of the pusher-type furnace.

For the heat or thermal treatment of bars or the like which are formed of aluminium or aluminium alloys and possessing a weight of several tons there are used so-called pusher-type or continuous heating furnaces. The bars are advanced through these furnaces and exposed to annealing temperatures of several hundred degrees centrigrade.

For the bar through-passage or feed through the furnace the bars or other treated stock are placed upon sliding shoes or elements which are displaceable upon rail means provided in the furnace. As a rule, such displacement is performed by a hydraulic pusher or feeding device which can develop a drive or motive power of several hundred tons.

If the furnace length and thus the displacement path of the therefore heavily loaded sliding shoes supported upon the rail means amounts to twenty meters and more, it will be readily appreciated that a considerable problem exists in maintaining the lubrication supply between the sliding shoes and the rail means.

This problem remains practically unsolved at a prior art furnace where the lubricant, for instance in the form of a graphite-oil mixture or the like, is applied between the sliding shoes and the rail means before the sliding shoes are placed thereupon. Even after a few meters of displacement of the sliding shoes upon the rail means such applied lubricant is consumed, whereupon the remainder of the displacement path is performed with dry sliding surfaces. The consequences of this are high wear and the need for a frequent exchange of the sliding shoes and the rail means.

Another heretofore known method involves using a dry, powdery or pulverulent graphite lubricant which is delivered to the rail means from substantially funnel-shaped storage chambers provided in a sliding shoe. Thus, while a limited lubrication can be maintained over the whole length of the displacement path, these measures are expensive and complicated.

SUMMARY OF THE INVENTION

Therefore, it is a primary object of the present invention to provide a new and improved construction of a sliding shoe which avoids the aforementioned drawbacks and limitations and allows for a movement of the sliding shoes upon the rail means which is essentially free of wear and jerks or jolting motion.

Still a further significant object of the present invention is to provide a new and improved construction of sliding shoe or member for a pusher-type furnace, which affords an improved sliding action between the sliding shoe and its related rail means of the furnace.

According to the invention these objects and others, which will become more readily apparent as the description proceeds, are attained in that the sliding shoe is provided with at least one sliding element which is arranged at the inner side or surface of the web of the sliding shoe and is intended to bear upon the rail means.

Preferably, the sliding elements are in the form of sliding ledges which extend lengthwise in the feed or pushing direction, but certain fields of application may require the use of differently shaped, for instance circular sliding elements.

It is, however, essential that the sliding elements are formed of a material which has a coefficient of friction which, at a furnace temperature of 600° to 700° C., is sufficient to guarantee a wear-free feed or advance of the sliding elements upon the rail means.

This material can be a special alloy which contains colloidal graphite as a self-lubricant, for instance a commercially available bearing metal which is obtainable at, for instance, the German firm Glacier GmbH/Deva Werke, located at Stadt Allendorf 1, West Germany, sold under their designation "DEVA".

Preferably, the invention may be constructed such that the material used for forming the sliding elements is compatible to cooperate with rail means formed of a heat-resistant steel or the like.

By virtue of these measures it is now possible to totally dispense with the use of lubricant of the initially described type or arrangement, while ensuring for a practically wear-free feed or advance of the sliding elements upon the rail means. Such feed of the sliding elements and, in turn, the sliding shoes is essentially without jerks or jolts and requires a lower drive or pushing force or power than the heretofore known constructions of the prior art.

BRIEF DESCRIPTION OF THE DRAWINGS

The invention will be better understood and objects other than those set forth above will become apparent when consideration is give to the following detailed description thereof. Such description makes reference to the annexed drawings wherein.

DETAILED DESCRIPTION OF THE PREFERRED EMBODIMENTS

Figure 1:
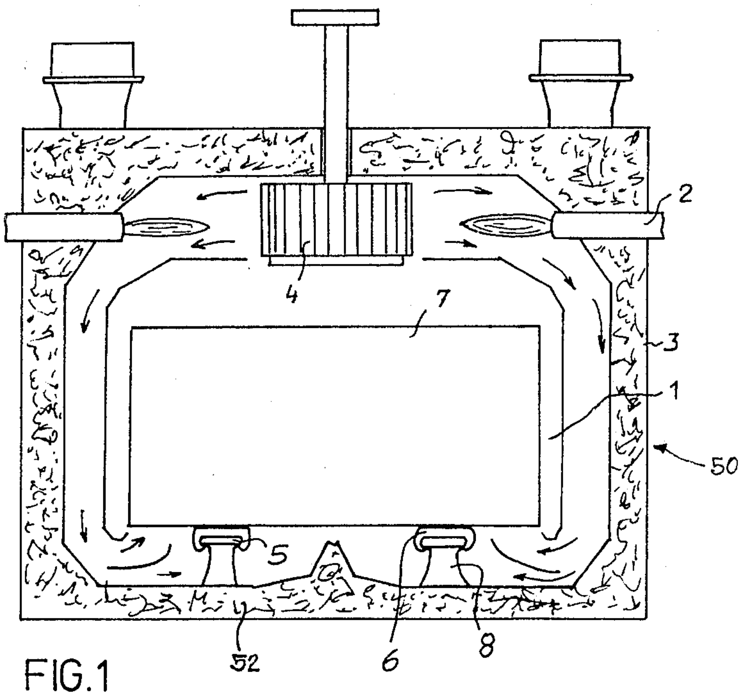
FIG. 1 is a schematic cross-sectional view of a pusher or continuous heating furnace with sliding shoes constructed according to the invention.

Describing now the drawings, FIG. 1 illustrates in lateral cross-sectional view a pusher-type or continuous heating furnace 50 which contains an annealing compartment or chamber 1 within which circulate hot gases. These hot gases are heated by burners 2 provided in the furnace shell or housing 3 and are circulated within the annealing compartment 1 by a ventilator 4 or equivalent structure.

At the floor or base of the furnace there will be recognized rails or rail means 5 which extend through the annealing compartment or chamber 1 over a length of often more than twenty meters. Such rails 5 run perpendicular to the plane of the drawing and are supported upon the floor or base 52 of the furnace by means of pedestals or supports 8 or equivalent structure.

Upon the rails or rail means 5 there repose a plurality of displaceable sliding shoes or elements 6 which are constructed according to the invention and will be described hereinafter in greater detail. Such sliding shoes or elements 6 serve to support, for instance, bars 7 to be heated. These bars 7 are advanced or fed through the furnace as initially described in greater detail.

Figure 2:
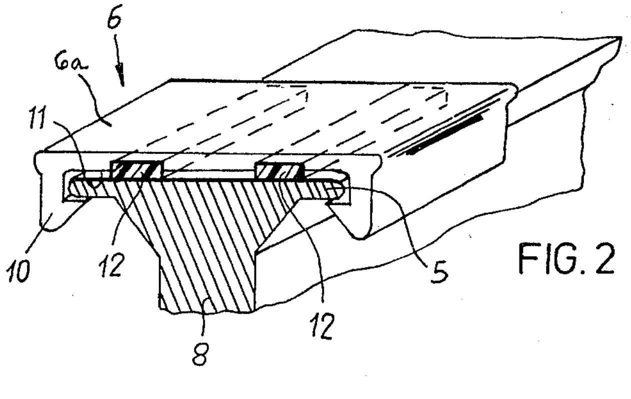
FIG. 2 is a perspective view on an enlarged scale of a sliding shoe or element and its coacting rail.

As can be seen in greater detail by referring to FIG. 2, the body 6a of the sliding shoe or element 6 has a substantially U-shaped profile or sectional shape and is provided with downwardly protruding legs or leg elements 10 for providing a laterally guided support of the sliding shoe or element 6 upon the related rail or rail means 5.

Sliding shoes of this type and their guide means for laterally guiding them upon the rails are known to the art, and thus, do not here require further explanation, particularly since such is unimportant for understanding the teachings of the present invention.

According to the invention, the sliding shoes or elements 6 importantly are provided with sliding elements 12 at the inner side or face of their web 11. These sliding elements 12 rest upon the rails 5 and, in the present embodiment, are constituted by, for instance, two sliding ledges 12 which extend longitudinally in the feed or pushing direction.

Such sliding ledges 12 slightly protrude away from the side of the shoe web 11 and can be connected in any suitable fashion to the related sliding shoe 6, for instance by a herein not further illustrated but conventional bolt or screw connection.

In order to achieve an essentially wear-free feed or advance of the sliding shoes 6 upon the rails or rail means 5, it has been found to yield the best results if there is used a material for forming the sliding elements 12 having a coefficient of friction, which at a surrounding furnace temperature of about 600° to 700° C., is sufficient for co-operation with the heat-resistant steel or the like from which the rails 5 are formed.

This material preferably is a commercially available special alloy which contains colloidal graphite as a self-lubricant, as heretofore explained.

With the above-described measures, which render any additional lubrication unnecessary, it can be expected that exchanging the sliding shoes will first become necessary only after several years of continuous operation.

Additionally, the sliding characteristics of the sliding shoes according to the invention allow for a uniform or steady feed of the processed material without jerks, which even permits a safe transport of, for instance, annealed blocks which are placed in an upright position.

While there are shown and described present preferred embodiments of the invention, it is to be distinctly understood that the invention is not limited thereto, but may be otherwise variously embodied and practiced within the scope of the following claims. ACCORDINGLY,

What we claim is:

1. A sliding shoe arrangement for pusher-type furnaces and serving for the sliding transport of objects to be heated in a predetermined feed direction and which are placed upon said sliding shoe, comprising:
   rail means;
   a sliding shoe cooperating with said rail means and having an at least approximately U-shaped cross-sectional shape and including a web;
   said sliding shoe containing downwardly protruding legs disposed laterally of said web and engaging with said rail means in order to provide a laterally guided supporting of said sliding shoe on said rail means of the pusher furnace;
   at least one sliding element arranged at an inner side of the web of said sliding shoe; and
   said sliding element bearing upon said rail means.

2. The sliding shoe arrangement as defined in claim 1, wherein:
   each of said sliding elements comprises a lengthwise extending sliding ledge with respect to the feed direction.

3. The sliding shoe arrangement as defined in claim 1 or 2, wherein:
   each of said sliding elements is formed of a material having a coefficient of friction sufficient for ensuring for a wear-free advance of each said sliding element upon said rail means at a furnace temperature in the order of about 600° C. to 700° C.

4. The sliding shoe arrangement as defined in claim 1, wherein:
   each of said sliding elements is formed of an alloy containing colloidal graphite as a self-lubricant.

5. The sliding shoe arrangement as defined in claim 3, wherein:
   said material used for forming each of the sliding elements is compatible for coacting with said rail means formed of heat-resistant steel.

6. The sliding shoe arrangement as defined in claim 1, wherein:
   said at least one sliding element constitutes a separate substantially wear-resistant element arranged at said inner side of said web of said sliding shoe.

7. The sliding shoe arrangement as defined in claim 6, wherein:
   said sliding shoe and said rail means are in direct sliding relationship with one another and said sliding element is interposed between said web of said sliding shoe and said rail means.

* * * * *